(12) United States Patent
Kato et al.

(10) Patent No.: US 8,783,284 B2
(45) Date of Patent: Jul. 22, 2014

(54) FLUID SUPPLY SYSTEM

(71) Applicant: Honda Motor Co., Ltd., Tokyo (JP)

(72) Inventors: Koichi Kato, Wako (JP); Koichi Takaku, Wako (JP); Saneto Asano, Wako (JP); Hiroyasu Ozaki, Wako (JP); Taneaki Miura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 13/685,709

(22) Filed: Nov. 27, 2012

(65) Prior Publication Data
US 2013/0133759 A1    May 30, 2013

(30) Foreign Application Priority Data
Nov. 28, 2011 (JP) .................................. 2011-259226

(51) Int. Cl.
*F16K 31/02*     (2006.01)

(52) U.S. Cl.
USPC ........ 137/487; 137/487.5; 137/488; 137/495; 137/630.19; 429/429; 429/428

(58) Field of Classification Search
USPC ................. 137/487, 487.5, 488, 495, 630.19; 429/428, 429
See application file for complete search history.

(56) References Cited

U.S. PATENT DOCUMENTS

| | | | | |
|---|---|---|---|---|
| 3,923,079 A | * | 12/1975 | Hughes et al. | 137/614.14 |
| 4,911,192 A | * | 3/1990 | Hartfiel et al. | 137/14 |
| 5,123,436 A | * | 6/1992 | Koechlein et al. | 137/12 |
| 5,406,975 A | * | 4/1995 | Nakamichi et al. | 137/495 |
| 5,419,367 A | * | 5/1995 | Noya | 137/495 |
| 6,815,108 B2 | * | 11/2004 | Ueda et al. | 429/429 |
| 6,953,045 B2 | * | 10/2005 | Enerson | 137/14 |
| 7,398,795 B2 | * | 7/2008 | Suzuki et al. | 137/487.5 |
| 7,659,018 B2 | * | 2/2010 | Aoyagi et al. | 429/431 |
| 8,158,293 B2 | * | 4/2012 | Naganuma et al. | 429/430 |
| 8,211,579 B2 | * | 7/2012 | Igarashi et al. | 429/429 |
| 8,283,083 B2 | * | 10/2012 | Kamihara et al. | 429/431 |
| 8,524,407 B2 | * | 9/2013 | Katano | 429/429 |
| 2004/0161644 A1 | * | 8/2004 | Ueda et al. | 429/13 |
| 2005/0103382 A1 | * | 5/2005 | Carter | 137/487.5 |
| 2007/0166577 A1 | * | 7/2007 | Inai et al. | 429/13 |
| 2007/0204915 A1 | * | 9/2007 | Kimbara et al. | 137/495 |
| 2008/0121288 A1 | * | 5/2008 | Suzuki et al. | 137/487.5 |
| 2009/0169963 A1 | * | 7/2009 | Takeshita et al. | 429/34 |

(Continued)

FOREIGN PATENT DOCUMENTS

| | | |
|---|---|---|
| JP | 2009-277620 | 11/2009 |
| JP | 2010-255746 | 11/2010 |

*Primary Examiner* — John Rivell
*Assistant Examiner* — Minh Le
(74) *Attorney, Agent, or Firm* — Mori & Ward, LLP

(57) ABSTRACT

A fluid supply system includes a fluid supply source, a first valve unit, a second valve unit, a first pressure detector, a second pressure detector, a third pressure detector, and a controller. If the pressure detected by the third pressure detector is less than a shutoff pressure at a timing of starting supply of fluid from the fluid supply source, the controller calculates a pressure equalization time from a timing at which opening of a pilot valve is completed to a timing at which a main valve starts closing, based on the pressures detected by the first pressure detector, the second pressure detector and the third pressure detector, sets a valve-open waiting time based on the pressure equalization time, and controls opening of the second valve unit upon elapse of the valve-open waiting time after controlling opening of the first valve unit.

5 Claims, 11 Drawing Sheets

(56) References Cited

U.S. PATENT DOCUMENTS

| | | | |
|---|---|---|---|
| 2010/0233556 A1* | 9/2010 | Yoshida et al. | 429/428 |
| 2010/0276012 A1* | 11/2010 | Watanabe et al. | 137/487.5 |
| 2011/0033762 A1* | 2/2011 | Yoshida | 429/428 |
| 2011/0143243 A1* | 6/2011 | Arthur et al. | 429/429 |
| 2011/0171548 A1* | 7/2011 | Matsumoto et al. | 429/429 |
| 2013/0034787 A1* | 2/2013 | Miyata et al. | 429/429 |
| 2013/0040218 A1* | 2/2013 | Katano | 429/429 |
| 2013/0186487 A1* | 7/2013 | Nomichi et al. | 137/487 |

* cited by examiner

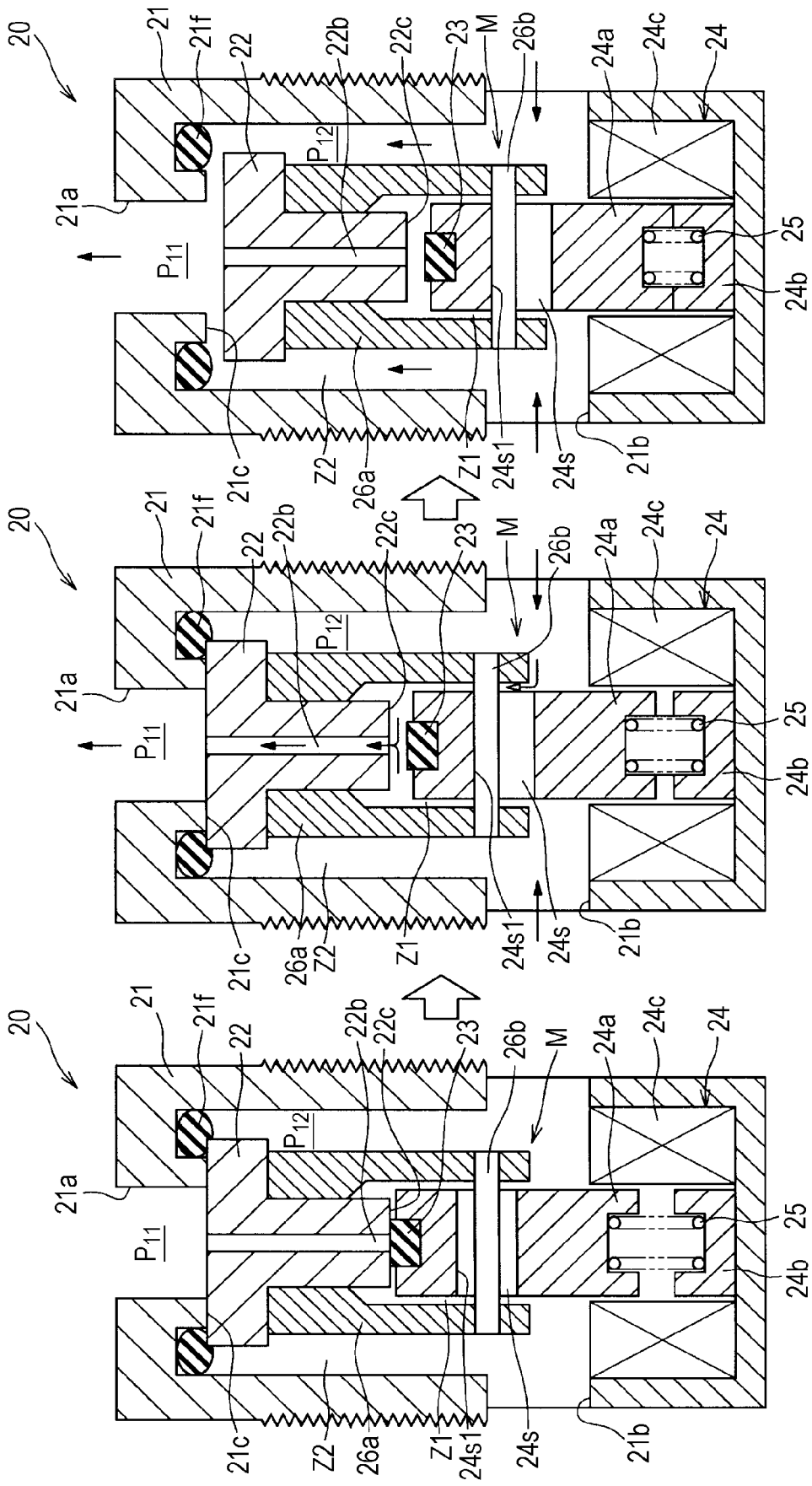

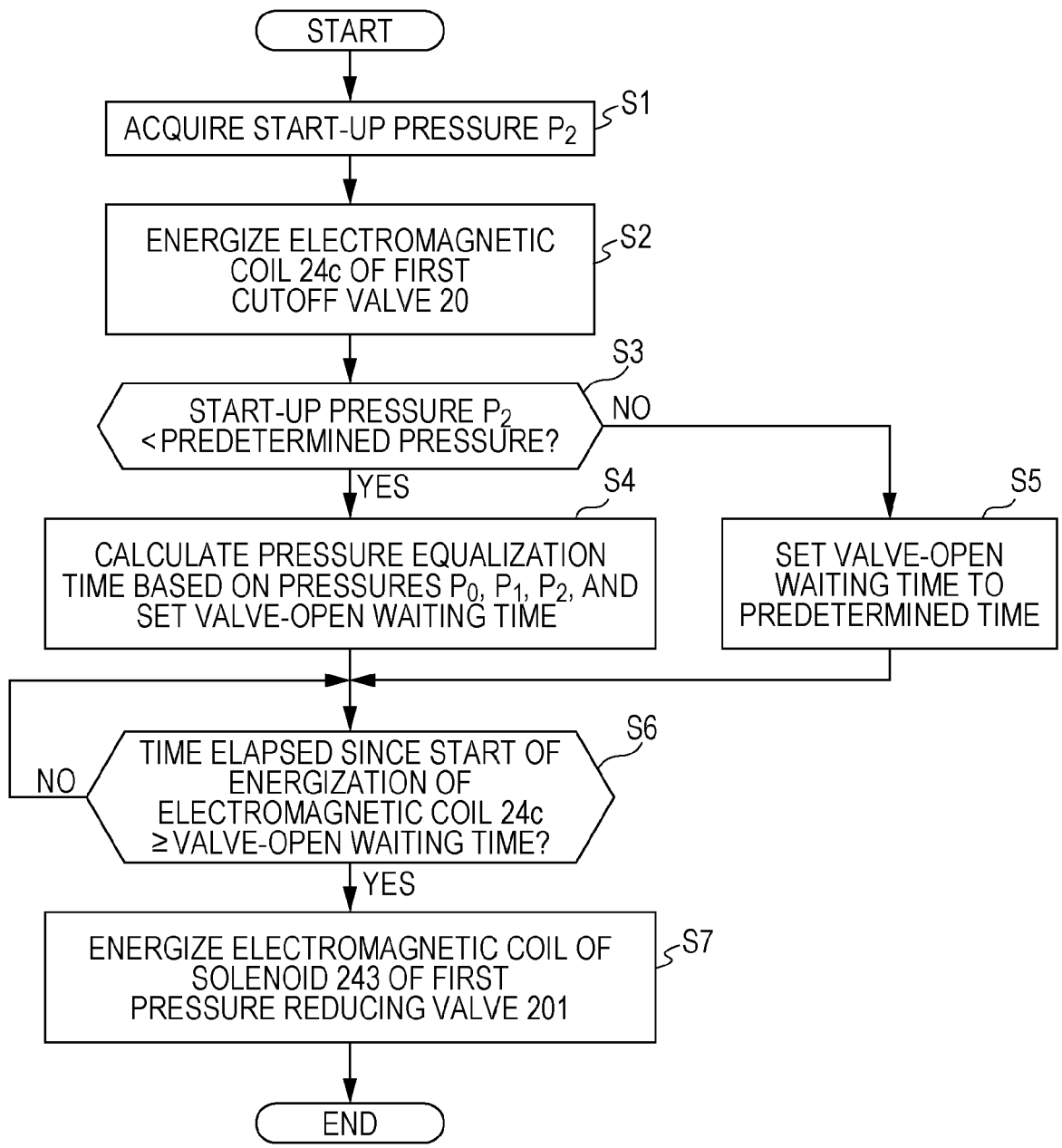

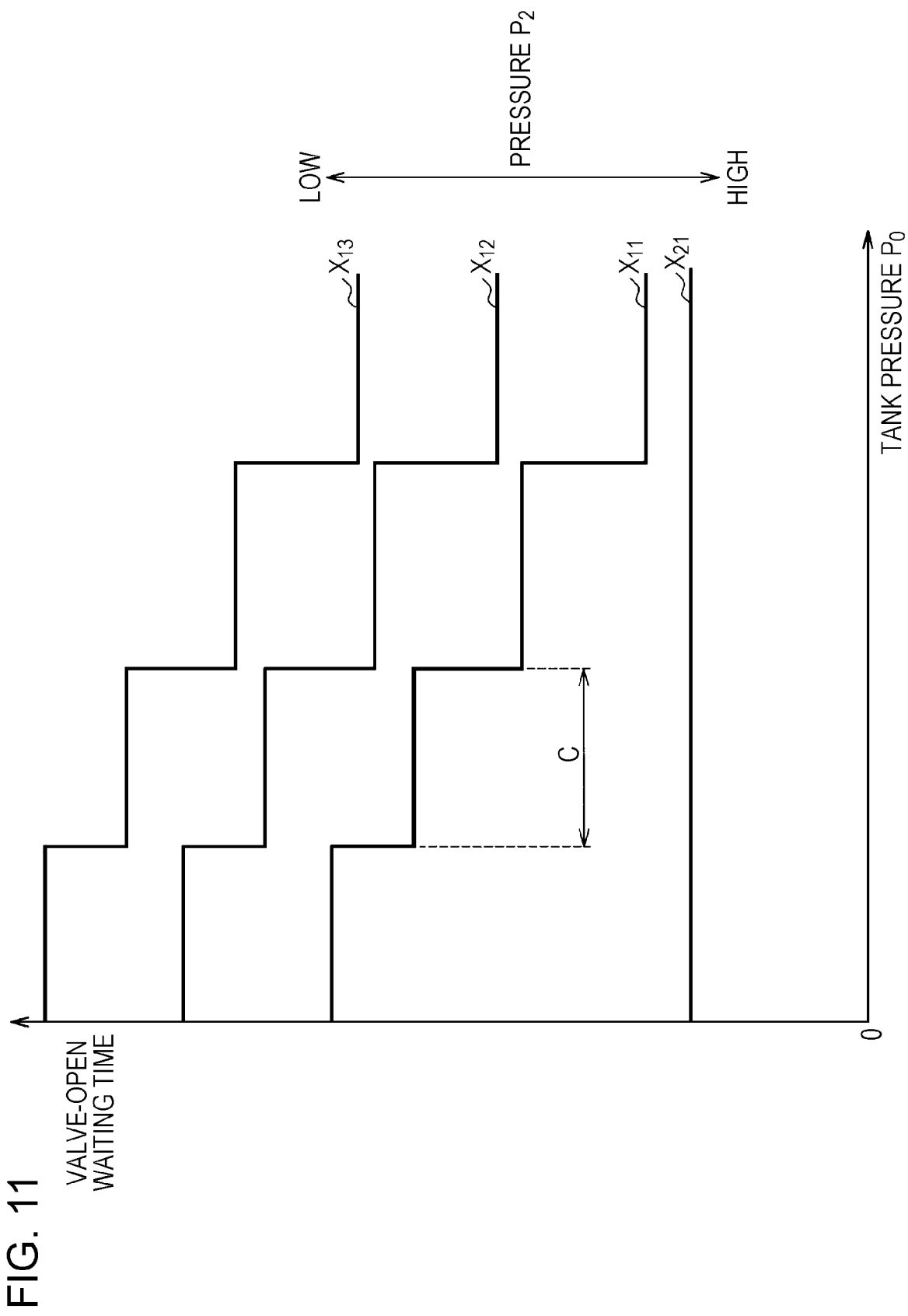

FLUID SUPPLY SYSTEM

CROSS-REFERENCE TO RELATED APPLICATIONS

The present application claims priority under 35 U.S.C. §119 to Japanese Patent Application No. 2011-259226, filed Nov. 28, 2011, entitled "Fluid Supply System." The contents of this application are incorporated herein by reference in their entirety.

BACKGROUND OF THE INVENTION

1. Field of the Invention

The present disclosure relates to a fluid supply system.

2. Discussion of the Background

There is a gas supply system that supplies gas to a fuel cell mounted in a vehicle or the like, and includes an electromagnetic shutoff valve which opens and closes a gas supply passage of a tank where the gas is stored, an on-off valve provided in the gas supply passage downstream of the shutoff valve to adjust the gas state and then supply the gas downstream, and a control unit which controls the actuation of the shutoff valve and on-off valve and starts the actuation of the on-off valve after detecting the opening of the shutoff valve based on a change in current to be supplied to the shutoff valve (see, for example, Japanese Unexamined Patent Application Publication No. 2010-255746).

According to the gas supply system with the above configuration, when the shutoff valve is actuated, the coil inductance varies, thus changing the magnetic field, so that the current supplied to the shutoff valve varies. The control unit detects actual opening of the shutoff valve based on the change in the current supplied to the shutoff valve, and then starts the actuation of the on-off valve.

Because the control unit detects actual opening of the shutoff valve based on a change in current, and then starts the actuation of the on-off valve, presetting the valve-open waiting time with the maximum time for the shutoff valve to open being taken as a reference can start the actuation of the on-off valve in a short period of time without providing a wasteful time compared to the case where the on-off valve is always actuated upon elapse of the valve-open waiting time.

SUMMARY OF THE INVENTION

According to one aspect of the present invention, a fluid supply system includes a fluid supply source, a first valve unit, a first line, a second valve unit, a second line, a first pressure detector, a second pressure detector, a third pressure detector, and a controller. The fluid supply source is to supply a fluid. The first valve unit is provided downstream of the fluid supply source to switch between a first open state to permit flow of the fluid from the fluid supply source and a first closed state to block flow of the fluid. The first valve unit has a pilot valve and a main valve. The first line is provided downstream of the first valve unit. The fluid flows in the first line. The second valve unit is provided downstream of the first line to switch between a second open state to permit flow of the fluid from the first line and a second closed state to block flow of the fluid from the first line. The second line is provided downstream of the second valve unit. The fluid flows in the second line. The first pressure detector is configured to detect a pressure in the fluid supply source. The second pressure detector is configured to detect a pressure in the first line. The third pressure detector is configured to detect a pressure in the second line. The controller is configured to control the first valve unit and the second valve unit. The second valve unit opens if the pressure in the second line is less than a shutoff pressure even if the second valve unit is set in the second closed state by the controller. If the pressure detected by the third pressure detector is less than the shutoff pressure at a timing of starting supply of the fluid from the fluid supply source, the controller calculates a pressure equalization time from a timing at which opening of the pilot valve is completed to a timing at which the main valve starts opening, based on the pressures detected by the first pressure detector, the second pressure detector and the third pressure detector, sets a valve-open waiting time based on the pressure equalization time, and controls opening of the second valve unit upon elapse of the valve-open waiting time after controlling opening of the first valve unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 5A, 5B and 5C are cross-sectional views illustrating the actuation of the first shutoff valve at the time of maintenance, respectively showing the actuation of the first shutoff valve at the time of non-excitation, the actuation thereof at the time of excitation, and the actuation thereof at the time of excitation.

FIG. 7 is a side cross-sectional view of the first shutoff valve according to the exemplary embodiment, and shows a state when the solenoid is ON.

FIG. 9 is a flowchart illustrating the fluid supply system according to the exemplary embodiment.

FIG. 11 is a graph showing an example of the relation between a tank pressure and a valve-open waiting time.

DESCRIPTION OF THE EMBODIMENTS

Figure 1:
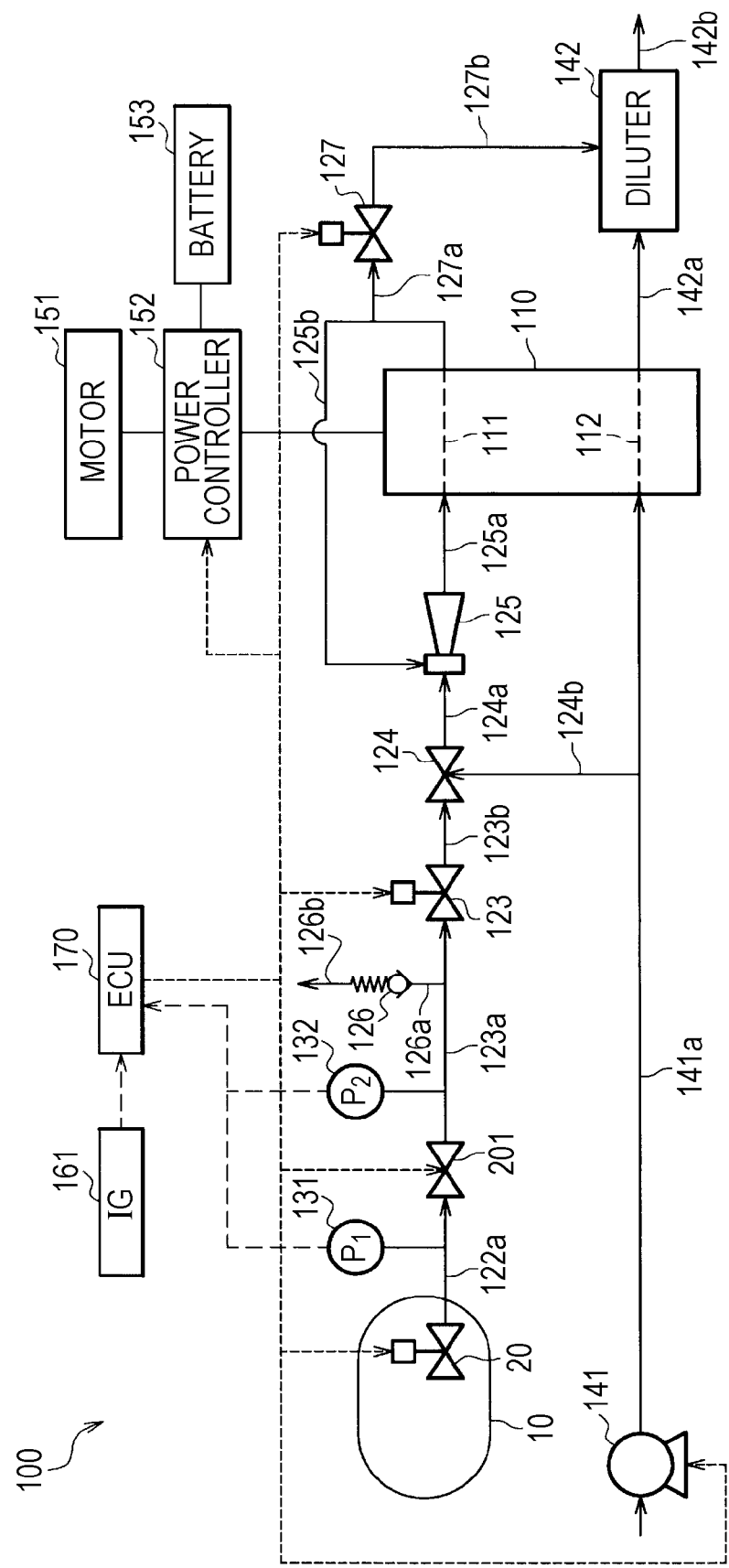
FIG. 1 is a configurational diagram of a fluid supply system according to an exemplary embodiment.

The embodiments will now be described with reference to the accompanying drawings, wherein like reference numerals designate corresponding or identical elements throughout the various drawings.

A fluid supply system according to an exemplary embodiment of the disclosure which is adapted to a fuel cell system mounted in a fuel cell vehicle will be described below with reference to FIGS. 1 to 11 by way of example in a case where hydrogen (fluid) is supplied to fuel cells.

Configuration of Fuel Cell System

A fuel cell system 100 (fluid supply system) as shown in FIG. 1 is mounted in an unillustrated fuel cell vehicle (vehicle or movable body). The fuel cell vehicle is, for example, a four-wheel vehicle, a three-wheeler, a two-wheeler, a unicycle, or a train. It is to be noted however that the fuel cell system 100 may be configured to be mounted in another movable body, such as a ship or aircraft.

The fuel cell system 100 includes a fuel cell stack 110, an anode system that supplies and discharges hydrogen (fuel gas, reaction gas) to the anode of the fuel cell stack 110, a cathode system that supplies and discharges hydrogen (oxidant gas, reaction gas) to the cathode of the fuel cell stack 110, a power control system that controls power generation of the fuel cell system 100, and an ECU (Electronic Control Unit) 170 that controls those components.

Fuel Cell Stack

The fuel cell stack 110 is a stack of a plurality of (e.g., 200 to 400) solid polymer type unit cells connected in series. The unit cell has an MEA (Membrane Electrode Assembly) and two conductive separators sandwiching the MEA. The MEA has an electrolyte membrane (solid polymer electrolyte) including a monovalent cation exchange membrane or the like, and an anode and a cathode (electrodes) sandwiching the electrolyte membrane.

Each of the anode and the cathode includes a conductive porous body such as carbon paper, and a catalyst (Pt, Ru or the like) which is carried on the porous body to cause an electrode reaction in the anode and the cathode.

Each separator has a groove formed to supply hydrogen or air to the entire surface of each MEA, and a through hole formed to supply and discharge hydrogen or air to and from the every unit cell. The groove and through hole serve as an anode passage 111 (fuel gas passage), and a cathode passage 112 (oxidant gas passage).

When hydrogen is supplied to each anode through the anode passage 111, an electrode reaction expressed by an equation 1, and when air is supplied to each cathode through the cathode passage 112, an electrode reaction expressed by an equation 2, producing a potential difference (OCV (Open Circuit Voltage)) in each unit cell. When the fuel cell stack 110 is electrically connected to an external circuit like a motor 151 to acquire a current therefrom, the fuel cell stack 110 generates power.

$$2H_2 \rightarrow 4H^+ + 4e^- \tag{1}$$

$$O_2 + 4H^+ + 4e^- \rightarrow 2H_2O \tag{2}$$

Anode System

The anode system includes a hydrogen tank 10 (gas supply source), a normally-closed first shutoff valve 20, a first pressure reducing valve 201, a normally-closed second shutoff valve 123, a second pressure reducing valve 124, an ejector 125, a relief valve 126, a normally-closed purge valve 127, a high-pressure sensor 131, an intermediate-pressure sensor 132, and a pipe 122a.

The hydrogen tank 10 is connected to the inlet of the anode passage 111 via the first shutoff valve 20, the pipe 122a, the first pressure reducing valve 201, a pipe 123a, the second shutoff valve 123, a pipe 123b, the second pressure reducing valve 124, a pipe 124a, the ejector 125, and a pipe 125a. When the first shutoff valve 20 and the second shutoff valve 123 open in response to an instruction from the ECU 170, hydrogen in the hydrogen tank 10 passes through the aforementioned valves and pipes to be supplied to the anode passage 111.

The hydrogen tank 10 includes a liner (tank chamber) 10a (partially shown in FIG. 2), which is formed inside of, for example, an aluminum alloy, for storing a hydrogen gas under high pressure, and a cover 10b (just partially shown in FIG. 2), which is formed of, for example, CFRP (Carbon Fiber Reinforced Plastic) or GFRP (Glass Fiber Reinforced Plastic), to cover around the liner 10a.

The first shutoff valve 20 is a normally-closed kick pilot type electromagnetic valve to be mounted at an opening 10c (see FIG. 2) formed in the hydrogen tank 10, and its opening and closing are controlled by the ECU 170 to be discussed later. The first shutoff valve 20 is a valve unit capable of switching between an open state to permit flow of hydrogen from the hydrogen tank 10 and a closed state to block flow of the hydrogen therefrom under control of the ECU 170.

Figure 2:
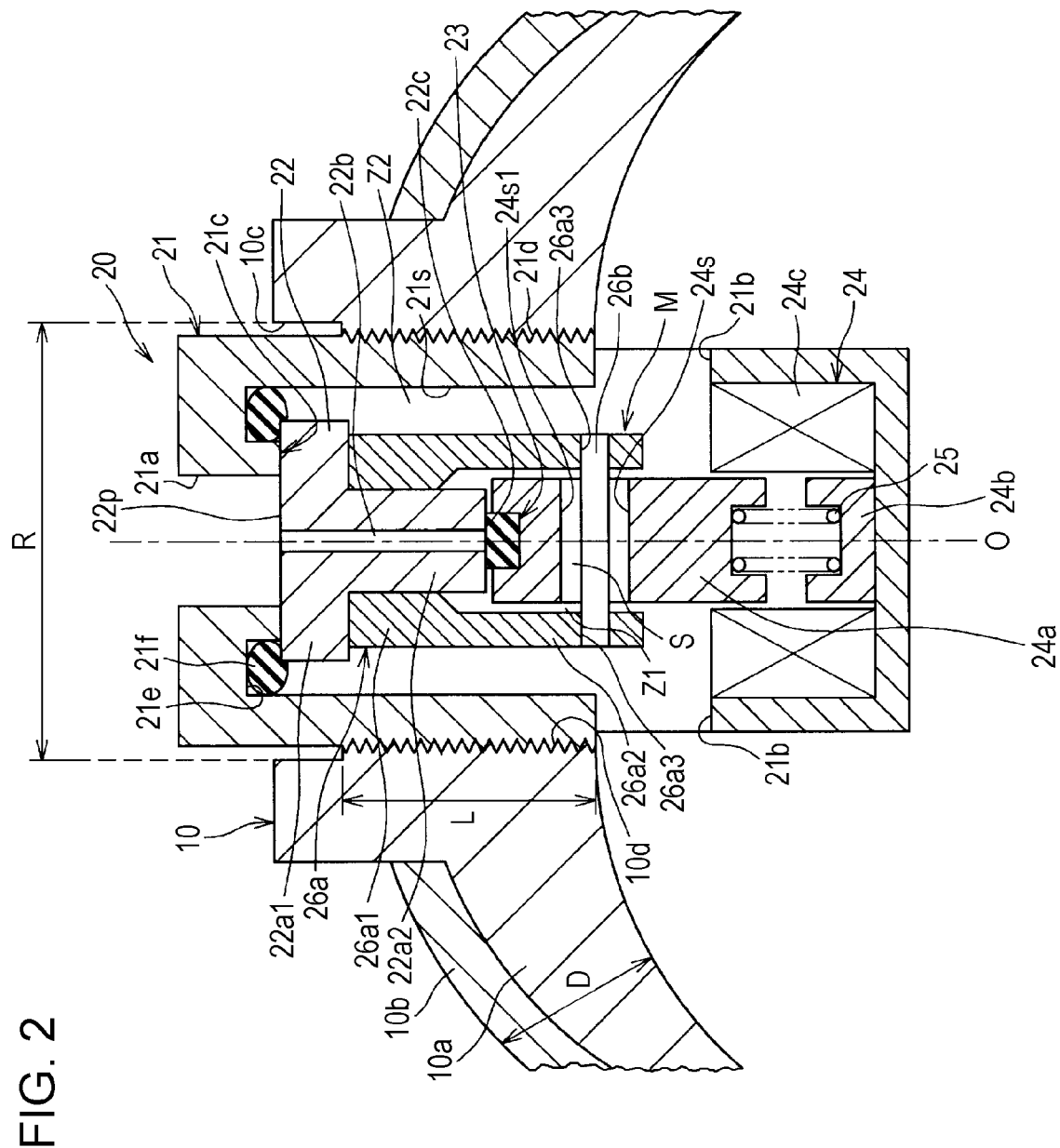
FIG. 2 is a side cross-sectional view of a first shutoff valve according to the exemplary embodiment.

As shown in FIG. 2, the first shutoff valve 20 is mounted on the hydrogen tank 10, and includes a valve box 21, an on-off valve body 22, a pilot valve body 23, a solenoid 24, a coil spring 25 (urging member), and an interlocking mechanism M. FIG. 2 shows the first shutoff valve 20 in a simplified form for the sake of easy explanation.

The valve box 21 has substantially a cylindrical retaining section 21s for accommodating the on-off valve body 22, the pilot valve body 23, the solenoid 24, the coil spring 25 and the interlocking mechanism M, and has a first communication hole 21a to communicate with the exterior of the hydrogen tank 10, and second communication holes 21b, 21b to communicate with the interior of the hydrogen tank 10. The locations of the second communication holes 21b are not limited to two, and may be one location or three or more locations.

A threaded groove 21d is formed on the outer surface of the valve box 21. The first shutoff valve 20 is mounted on the hydrogen tank 10 by engagement of this threaded groove 21d with a threaded groove 10d formed at the opening 10c of the hydrogen tank 10. The hydrogen tank 10 and the first shutoff valve 20 is configured to be connected to each other via a seal member (not shown) such as an O ring so that hydrogen in the hydrogen tank 10 does not leak out.

An on-off valve seat 21c is provided inside the valve box 21. Abutment of the on-off valve body 22 on the on-off valve seat 21c blocks communication of the first communication hole 21a with the interior of the hydrogen tank 10, and disengagement of the on-off valve body 22 from the on-off valve seat 21c permits the first communication hole 21a to communicate with the interior of the hydrogen tank 10. The on-off valve seat 21c is formed by a recess 21e formed like a ring circumferentially so that the recessed surface faces downward in the hydrogen tank 10 in FIG. 2, and a seal member 21f of rubber or resin fitted in the recess 21e. The abutment of the circumferential portion of the distal end (illustrated upper end) of the on-off valve body 22 on the seal member 21f blocks communication of the first communication hole 21a with the interior of the hydrogen tank 10.

The on-off valve body 22, which operates as the main valve of the first shutoff valve 20, is formed into, for example, substantially a T shape in cross-sectional view rectangular parallelepiped, and is accommodated in the retaining section 21s. The distal end (illustrated upper portion) of the on-off valve body 22 is a large-diameter portion 22a1 larger in diameter than the opening of the first communication hole 21a, and is abuttable on the seal member 21f. According to the embodiment, the top surface of the on-off valve body 22 (large-diameter portion 22a1) facing the first communication hole 21a serves as a pressure receiving surface 22p which receives the pressure (gas pressure) of hydrogen when the gas is filled in the hydrogen tank 10. The proximal end portion (illustrated lower portion) of the on-off valve body 22 is a small-diameter portion 22a2 smaller in diameter than the large-diameter portion 22a1.

A pilot passage 22b which passes through the center portions of the large-diameter portion 22a1 and the small-diameter portion 22a2 along the direction of an axis O is formed in the on-off valve body 22. The proximal end (one end or illustrated lower end) of the on-off valve body 22 is formed to serve as a pilot valve seat 22c of the pilot valve body 23 to be discussed later.

The pilot valve body 23 is configured so as to be disposed concentrical to the on-off valve body 22 and be disposed at a position facing the formed in the pilot passage 22b on-off valve body 22. The pilot valve body 23 is formed of an elastic material like rubber or resin, and is larger in diameter than the pilot passage 22b. The arrangement of the on-off valve body 22 and the pilot valve body 23 concentrical to each other makes it possible to shorten the radial-directional size of the first shutoff valve 20.

The pilot valve may be configured in such a way that the seal member is provided on the side of the on-off valve body 22, not on the side of the pilot valve body 23. Further, the on-off valve may be configured in such a way that the seal member is provided on the side of the on-off valve body 22, not on the side of the on-off valve seat 21c.

The solenoid 24 generates drive force at the time of opening the on-off valve body 22 and the pilot valve body 23, and includes a plunger 24a, a fixed core 24b and an electromagnetic coil 24c.

The plunger 24a is formed of a magnetic material into substantially a cylindrical shape extending like a rod in the direction of the axis O. The pilot valve body 23 is fitted into the distal end (one end or illustrated upper end) of the plunger 24a. It is to be noted that the plunger 24a is also disposed concentrical to the on-off valve body 22 and the pilot valve body 23.

The fixed core 24b is formed of a magnetic material and is fixed to the bottom of the retaining section 21s formed in the valve box 21. The fixed core 24b has substantially a cylindrical shape, and is disposed to face the proximal end (illustrated lower end) of the plunger 24a in such a way as to be concentrical to the plunger 24a.

The electromagnetic coil 24c is wound around an unillustrated bobbin, and is disposed in such a way as to surround the plunger 24a and the fixed core 24b.

The coil spring 25 has one end connecting the proximal end (the other end) of the plunger 24a, and the other end disposed to connect the fixed core 24b, so that the coil spring 25 pushes the plunger 24a to urge the on-off valve body 22 toward the on-off valve seat 21c. The spring force of the coil spring 25 is set so as to close the on-off valve body 22 when the pressure in the hydrogen tank 10 reaches a preset target filling pressure (preset fluid pressure) at the time of filling hydrogen in the hydrogen tank 10 (at the time of filling the gas). The target filling pressure is the pressure to make the hydrogen tank 10 fully filled with hydrogen (gas).

The interlocking mechanism M interlocks the on-off valve body 22 with the plunger 24a with a predetermined play. The interlocking mechanism M includes a support member 26a, an engagement pin 26b, and a connection hole 24s formed in the plunger 24a.

The support member 26a is formed in substantially a cylindrical shape extending in the axial direction. The support member 26a has a first cylindrical portion 26a1 positioned on the on-off valve body 22 side (upper side), and a second cylindrical portion 26a2 formed to have a larger inside diameter than the first cylindrical portion 26a1 and formed larger in diameter than the plunger 24a. The second cylindrical portion 26a2 extends to the position of a midway height of the second communication hole 21b.

Accordingly, the first cylindrical portion 26a1 abuts on the bottom surface of the large-diameter portion 22a1 of the on-off valve body 22 and is fitted over the small-diameter portion 22a2 thereof to be fixed to the on-off valve body 22. A part of the proximal end of the on-off valve body 22 protrudes into the second cylindrical portion 26a2, and a part (illustrated upper portion) of the plunger 24a is inserted in the second cylindrical portion 26a2, forming a gas flow portion Z1 between the second cylindrical portion 26a2 and the plunger 24a to permit hydrogen to flow.

The engagement pin 26b is disposed to extend in a direction orthogonal to the direction of the axis O, and is fixed to mount holes 26a3, 26a3 formed in the second cylindrical portion 26a2. The connection hole 24s in which the engagement pin 26b is formed through across the plunger 24a at the height position of the engagement pin 26b. The connection hole 24s is formed to have a width (height) which permits the engagement pin 26b to move inside, and to form a clearance (play) S at the upper portion (on the on-off valve body 22 side and the pilot valve body 23 side) of the engagement pin 26b. Although FIG. 2 shows a structure having clearances formed at the upper and lower portions of the engagement pin 26b, the structure may have the clearance S formed only on the illustrated upper side of the engagement pin 26b when the first shutoff valve 20 (on-off valve body 22 and pilot valve body 23) is closed as shown in FIG. 2.

In the first shutoff valve 20 according to the embodiment, an on-off valve passage Z2 which permits hydrogen to pass when the on-off valve body 22 opens is formed between the valve box 21, and the on-off valve body 22 and the support member 26a. The on-off valve passage Z2 permits flow of hydrogen in such a way that hydrogen is led out through the second communication hole 21b after it is supplied through the first communication hole 21a at the time of filling the gas, and hydrogen is led out through the first communication hole 21a after it is supplied through the second communication hole 21b at the time of supplying the gas. Apparently, the on-off valve passage Z2 makes the direction of hydrogen flow different (opposite) between at the time of filling the gas and at the time of supplying the gas according to the embodiment.

According to the embodiment, the on-off valve seat 21c, the on-off valve body 22, the solenoid 24 and the interlocking mechanism M constitute the on-off valve, and the pilot passage 22b, the pilot valve body 23 and the solenoid 24 constitute the pilot valve.

Figure 3A:
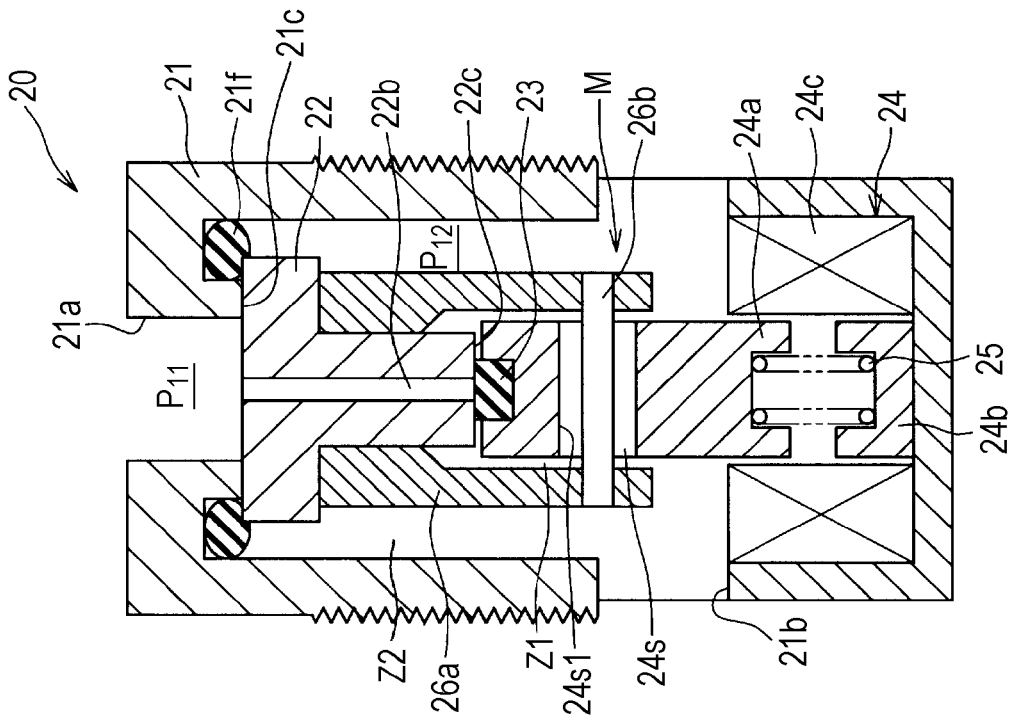
FIGS. 3A and 3B are cross-sectional views illustrating the actuation of the first shutoff valve at the time a gas is filled in a tank, respectively showing the actuation of the first shutoff valve at the time of non-excitation and the actuation thereof at the time of excitation.
Figure 3B:
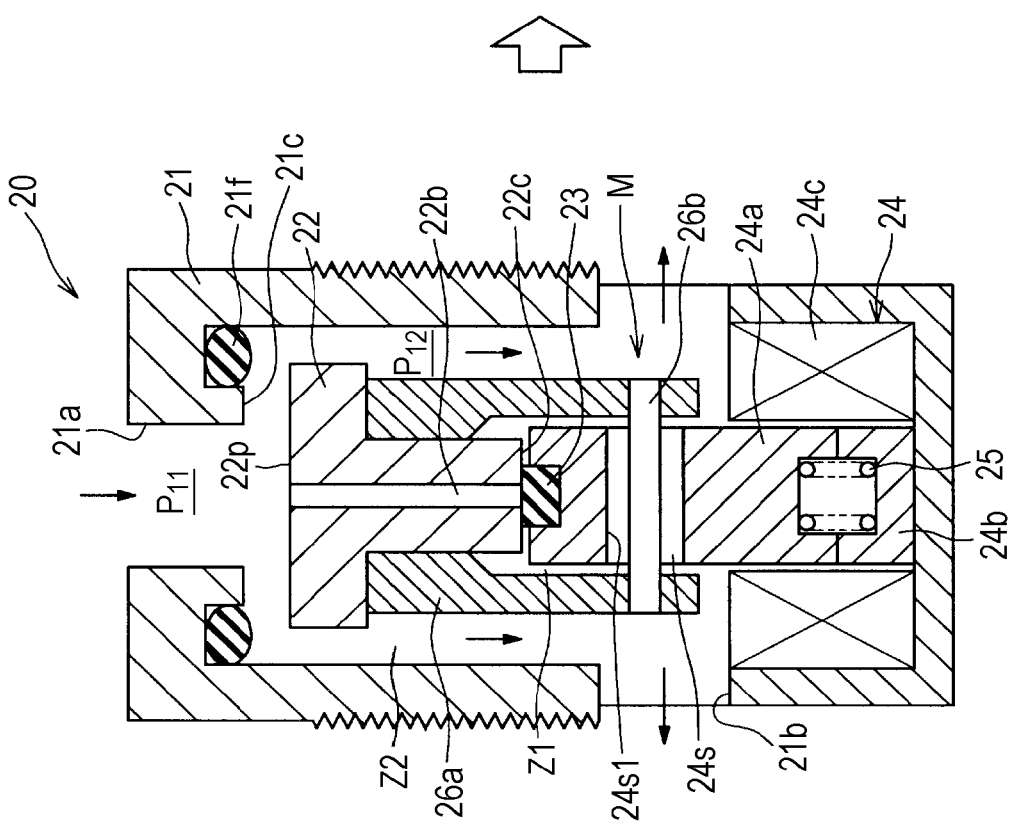
Figure 4A:
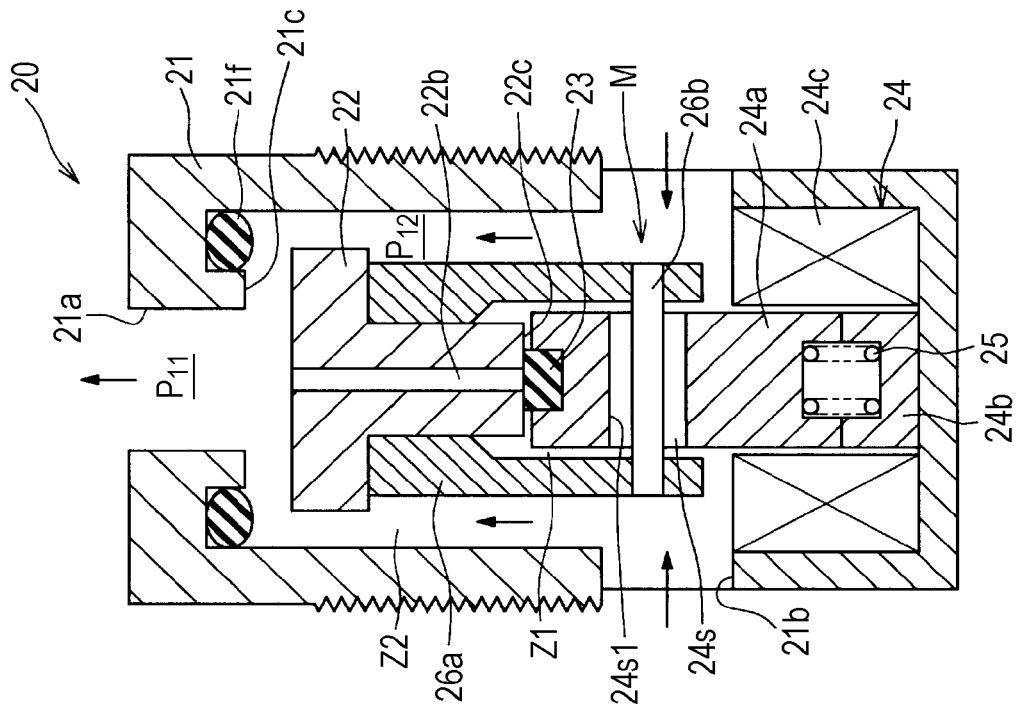
FIGS. 4A and 4B are cross-sectional views illustrating the actuation of the first shutoff valve at the time the gas is supplied to a fuel cell, respectively showing the actuation of the first shutoff valve at the time of non-excitation and the actuation thereof at the time of excitation.
Figure 4B:
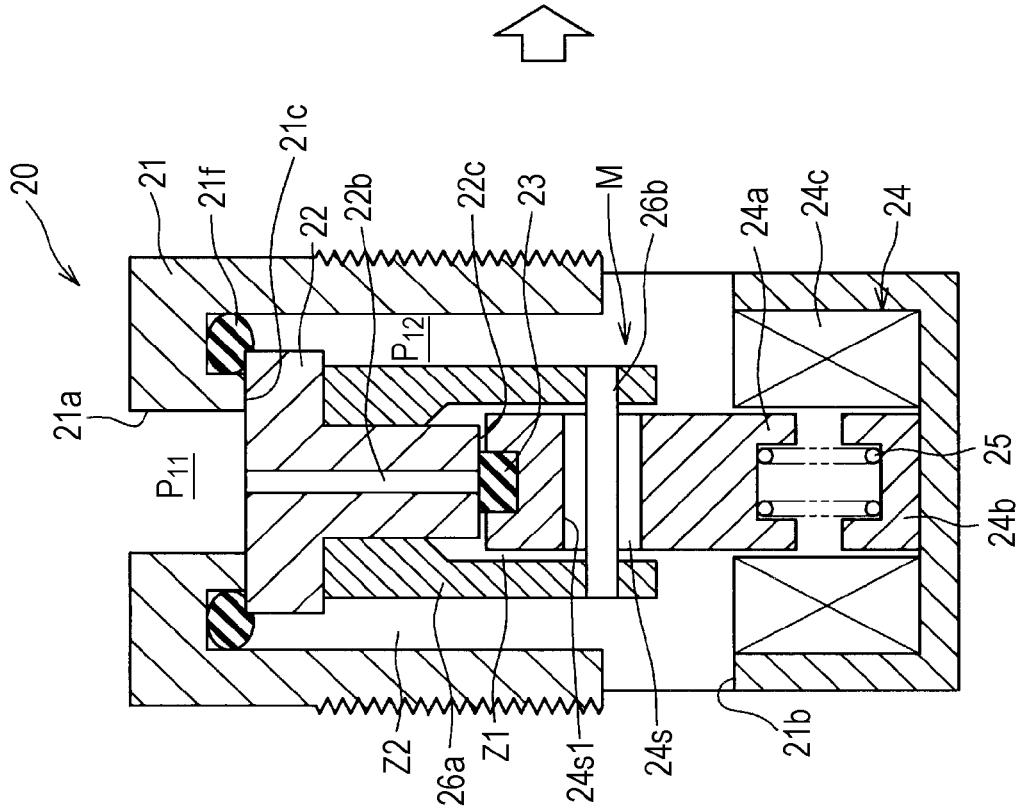

Next, the operation of the first shutoff valve 20 of the fuel cell system 100 according to the embodiment will be described referring to FIGS. 3A, 3B, 4A, 4B, and 5A to 5C. FIGS. 3A and 3B are cross-sectional views illustrating the actuation of the first shutoff valve 20 at the time the gas is filled in the hydrogen tank 10, respectively showing the actuation of the first shutoff valve 20 at the time of non-excitation ($P_{11} > P_{12}$) and the actuation thereof at the time of excitation ($P_{12}$=target filling pressure). FIGS. 4A and 4B are cross-sectional views illustrating the actuation of the first shutoff valve 20 at the time the gas is supplied to the fuel cell, respectively showing the actuation of the first shutoff valve 20 at the time of non-excitation ($P_{11} = P_{12}$) and the actuation thereof at the time of excitation. FIGS. 5A, 5B and 5C are cross-sectional views illustrating the actuation of the first shutoff valve 20 at the time of maintenance, respectively showing the actuation of the first shutoff valve 20 at the time of non-excitation ($P_{11} \ll P_{12}$), the actuation thereof at the time of excitation ($P_{11} < P_{12}$), and the actuation thereof at the time of excitation ($P_{11} = P_{12}$).

To begin with, in case of filling the hydrogen tank 10 with hydrogen, the solenoid 24 is in a non-excitation (deexcitation) state in which the on-off valve body 22 and the pilot valve body 23 are both urged by the urging force of the coil spring 25 so that the pilot valve body 23 is closed in the direction of pressing the pilot valve seat 22c and the on-off valve body 22 is closed in the direction of pressing the on-off valve seat 21c (state shown in FIG. 2).

Then, when filling hydrogen through a filling port (not shown) starts, a first check valve (not shown) at the filling port opens, and filling of hydrogen toward the first shutoff valve 20 starts via a pipe (not shown).

Given that the pressure on the upstream side of the on-off valve body 22 (outside the first shutoff valve 20) is $P_{11}$, and the pressure on the downstream side of the on-off valve body 22 (inside the hydrogen tank 10 (see FIG. 1)) is $P_{12}$ at this time as shown in FIG. 3A, the pressure $P_{11}$ is higher than the pressure $P_{12}$ ($P_{11} > P_{12}$), so that the pressure $P_{11}$ on the filling port side presses the pressure receiving surface 22p of the on-off valve body 22, separating the on-off valve body 22 from the on-off valve seat 21c. As a result, the first communication hole 21a and the second communication hole 21b communicate with each other through the on-off valve passage Z2, so that hydrogen flows through the on-off valve passage Z2 in the directions of arrows in FIG. 3A to fill the hydrogen tank 10.

When the pressure $P_{12}$ in the hydrogen tank 10 reaches a preset predetermined pressure (e.g., target filling pressure which makes the hydrogen tank 10 fully filled with hydrogen), the pressure $P_{11}$ becomes equal to the pressure $P_{12}$ ($P_{11} = P_{12}$), and the urging force of the coil spring 25 presses the on-off valve body 22 together with the pilot valve body 23, closing the on-off valve body 22. As a result, communication of the first communication hole 21a with the on-off valve passage Z2 is shut off, thus completing the filling of hydrogen.

When an ignition switch 161 of the vehicle is set ON, the ECU 170 starts supplying hydrogen to fuel cells FC. That is, at the time of supplying the gas (at the time of supplying hydrogen), the ECU 170 outputs an instruction to excite the solenoid 24 of the first shutoff valve 20. At this time, immediately after filling the gas is completed, the pressure $P_{11}$ is substantially equal to the pressure $P_{12}$ when the first shutoff valve 20 is closed, as shown in FIG. 4A, excitation of the solenoid 24 prevents the pilot valve body 23 from opening, and causes the on-off valve body 22 to be immediately separated from the on-off valve seat 21c and opened, as shown in FIG. 4B. The opening of the on-off valve body 22 permits the first communication hole 21a and the second communication hole 21b to communicate with each other via the on-off valve passage Z2, so that hydrogen flows through the on-off valve passage Z2 in the directions of arrows in FIG. 4B to be supplied toward the first pressure reducing valve 201 from the hydrogen tank 10.

The hydrogen supplied from the hydrogen tank 10 via the first shutoff valve 20 is supplied to the anode of the fuel cell stack 110 after its pressure is reduced by the first pressure reducing valve 201. Along with the gas supply, the ECU 170 starts driving a compressor 141 to compress air taken inside from outside the vehicle. The compressed air is humidified by a humidifier (not shown), and is then supplied to the cathode of the fuel cell stack 110. The power generated by the fuel cells FC is supplied to an external load such as a drive motor (not shown).

At the time of maintenance (air-tight test, pressure test, etc.), such as inspection of the hydrogen tank 10, as shown in FIG. 5A, the pressure $P_{11}$ on the downstream side of the on-off valve body 22 becomes low, and the pressure $P_{12}$ in the hydrogen tank 10 becomes high, so that the differential pressure (anteroposterior differential pressure) between upstream and downstream of the on-off valve body 22 becomes significantly large.

When the solenoid 24 is excited by the ECU 170 at the time of maintenance this way, as shown in FIG. 5B, the plunger 24a is pulled downward in the diagram, so that the pilot valve body 23 is separated from the pilot valve seat 22c and opened. Because the anteroposterior differential pressure of the on-off valve body 22 is very high, the on-off valve body 22 does not open even if the solenoid 24 is excited. Therefore, hydrogen in the hydrogen tank 10 passes through the second communication hole 21b, the gas flow portion Z1, the pilot passage 22b and the first communication hole 21a to flow out of the hydrogen tank 10 as indicated by arrows in FIG. 5B.

In this manner, hydrogen flows out through the pilot passage 22b so that the pressure $P_{11}$ on the downstream side of the on-off valve body 22 (on the first pressure reducing valve 201 side and on the fuel cell FC side) gradually approaches the pressure $P_{12}$ on the upstream side of the on-off valve body (on the hydrogen tank 10 side). When the pressure $P_{11}$ becomes equal to the pressure $P_{12}$, the on-off valve body 22 is separated from the on-off valve seat 21c as shown in FIG. 5C. That is, when the pressure $P_{11}$ becomes equal to the pressure $P_{12}$ in the state shown in FIG. 5B, the plunger 24a is pulled downward in the diagram by the attraction force of the solenoid 24. At this time, the engagement pin 26b is already in abutment with an upper surface 24s1 inside the connection hole 24s, so that further pulling down the plunger 24a pulls down the engagement pin 26b and pulls down the on-off valve body 22 at the same time. As a result the on-off valve body 22 opens as shown in FIG. 5C. In other words, the on-off valve body 22 and the pilot valve body 23 of the first shutoff valve 20 which is a normally-closed kick pilot type electromagnetic valve are closed normally (when they are not controlled), blocking flow of hydrogen. When opening control is performed by the ECU 170, the pilot valve body 23 is opened to permit flow of hydrogen through the pilot passage 22b. Subsequently, when the differential pressure which is the difference between the pressure in the upstream hydrogen tank 10 and the pressure in the downstream pipe 122a drops to a predetermined value (zero in this example), the on-off valve body 22 is opened to permit flow of hydrogen through the first communication hole 21a.

First Pressure Reducing Valve

Figure 6:
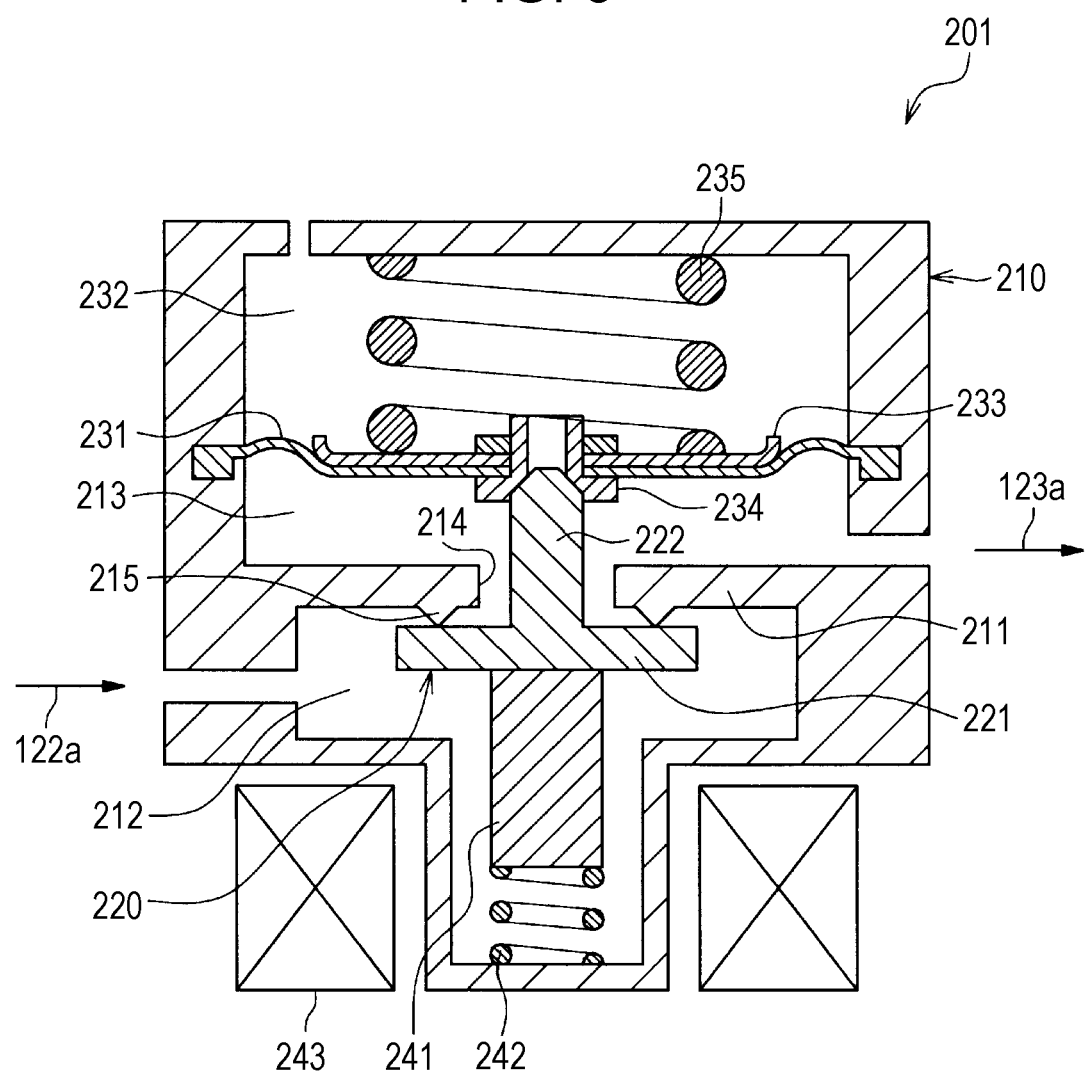
FIG. 6 is a side cross-sectional view of the first shutoff valve according to the exemplary embodiment, and shows a closed state when a solenoid is OFF.
Figure 7:
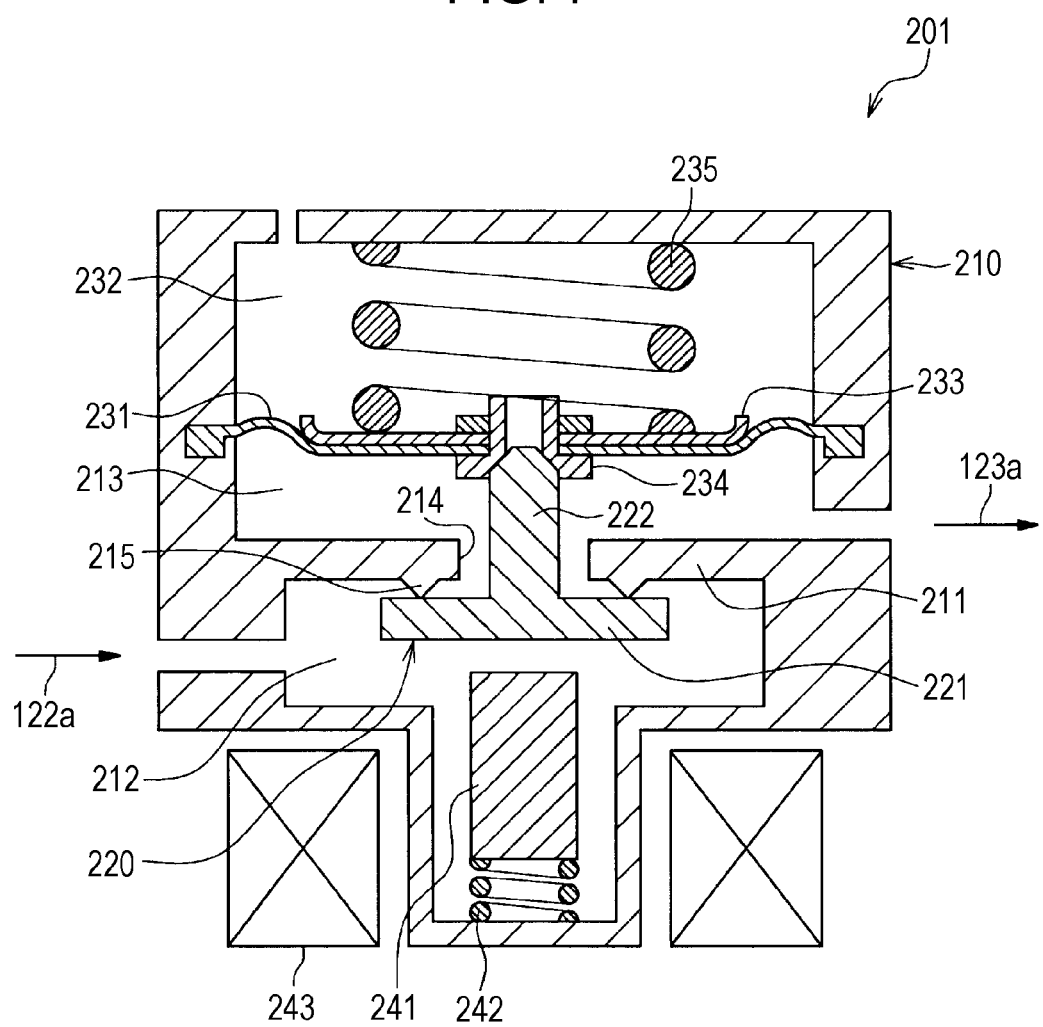
Figure 8:
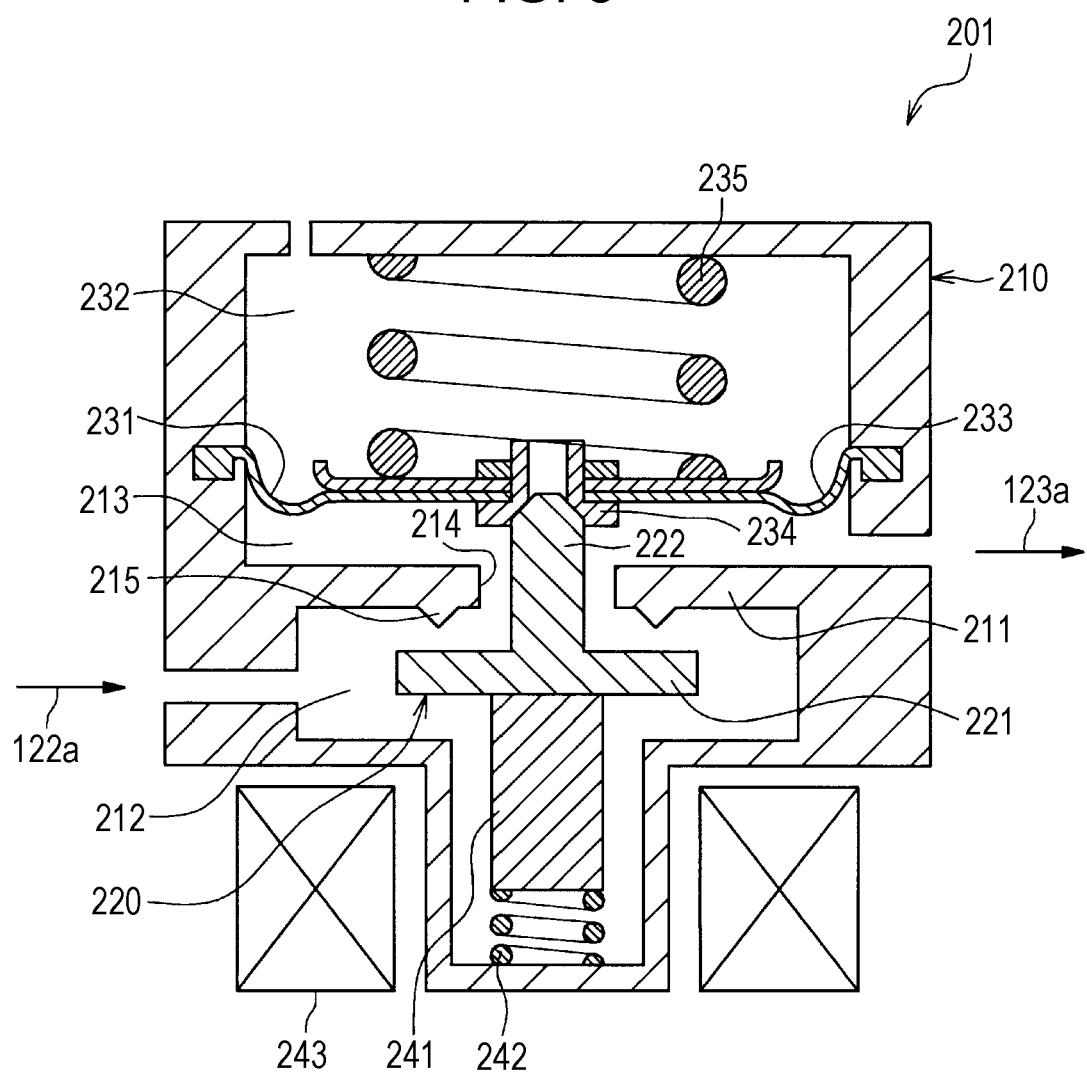
FIG. 8 is a side cross-sectional view of the first shutoff valve according to the exemplary embodiment, and shows an open state when the solenoid is OFF.

The first pressure reducing valve 201 is an exhaust valve including a pressure reducing mechanism to reduce the pressure of hydrogen, and a closed-position holding mechanism capable of holding a valve body 220 at a closed position as shown in FIGS. 6 to 8. The first pressure reducing valve 201 is a valve unit capable of switching between an open state to permit flow of hydrogen through the pipe 122a and a closed state to block flow of hydrogen under control of the ECU 170. The first pressure reducing valve 201 has a mechanism that opens the first pressure reducing valve 201 when the pressure in the pipe 123a is less than the shutoff pressure even when the first pressure reducing valve 201 is set in the closed state under control of the ECU 170.

Specifically, the first pressure reducing valve 201 includes a housing 210, the valve body 220 which reciprocally moves in a predetermined direction (up-down direction in FIG. 6) in the housing 210, and a diaphragm 231. The interior of the housing 210 is partitioned into a primary-side pressure chamber 212 and a secondary-side pressure chamber 213 by a partition wall 211. Hydrogen from the pipe 122a flows into the primary-side pressure chamber 212, and hydrogen in the secondary-side pressure chamber 213 flows out into the pipe 123a.

A communication port 214 which permits the primary-side pressure chamber 212 and the secondary-side pressure chamber 213 to communicate with each other is formed in the partition wall 211, and a valve rod 222 to be discussed later is freely inserted in the communication port 214. An annular valve seat 215 is formed on the primary-side pressure chamber 212 side of the partition wall 211 surrounding the communication port 214.

The valve body 220 includes a disk-shaped valve head 221 disposed in the primary-side pressure chamber 212, and the valve rod 222 freely inserted in the communication port 214. When the valve head 221 seats on the valve seat 215, the first pressure reducing valve 201 is set in the closed state, and when the valve head 221 moves off the valve seat 215, the first pressure reducing valve 201 is set in the open state.

The diaphragm 231 is provided in such a way as to face the secondary-side pressure chamber 213, and has an atmospheric chamber 232 formed on its back side (opposite side to the partition wall 211) to communicate with the atmosphere. The central portion of the diaphragm 231 is sandwiched by an adapter 233 and an adapter 234 which is coupled to the distal end portion of the valve rod 222. Accordingly, the diaphragm 231 and the valve body 220 move together.

The first pressure reducing valve 201 includes a compression coil spring 235 interposed between the diaphragm 231 (adapter 233) and the housing 210. The compression coil spring 235 urges the valve body 220 in the opening direction (downward in FIG. 6) via the adapter 233 and the adapter 234.

The first pressure reducing valve 201 includes a plunger 241, a compression coil spring 242, and a solenoid 243. The plunger 241 is disposed on the rear side of the valve head 221 (opposite side to the valve seat 215) in such a way as to be movable forward and backward coaxially to the valve rod 222. The compression coil spring 242 is interposed between the plunger 241 and the housing 210 to urge the plunger 241 toward the valve body 220. The solenoid 243 moves the plunger 241 forward and backward under ON/OFF (energization/non-energization) control by the ECU 170.

First Pressure Reducing Valve-Closed-Position Holding Mechanism

The closed-position holding mechanism of the first pressure reducing valve 201 will be described below.

When the solenoid 243 is set OFF, the plunger 241 urged by the compression coil spring 242 abuts on the back side of the valve head 221, so that the valve head 221 seats on the valve seat 215. The seating of the valve head 221 on the valve seat 215 keeps the valve body 220 at the closed position, and keeps the first pressure reducing valve 201 at the closed position.

Therefore, the closed-position holding mechanism which can keep the valve body 220 at the closed position includes the plunger 241, the compression coil spring 242 and part of the housing 210.

First Pressure Reducing Valve-Pressure Reducing Mechanism

The pressure reducing mechanism of the first pressure reducing valve 201 will now be described. The pressure reducing mechanism functions in the open state of the first pressure reducing valve 201 shown in FIG. 1 and when the solenoid 243 is set ON so that the plunger 241 is separated from the valve head 221 as shown in FIG. 7.

When the pressure in the secondary-side pressure chamber 213 is high so that the combined force of the force of hydrogen in the secondary-side pressure chamber 213 which urges the diaphragm 231 upward in FIG. 6 and the force of hydrogen in the primary-side pressure chamber 212 which urges the valve body 220 upward in FIG. 6 is greater than the force of the compression coil spring 235 which urges the diaphragm 231 downward in FIG. 6, the valve head 221 seats on the valve seat 215, setting the first pressure reducing valve 201 in the closed state.

When hydrogen is consumed by the fuel cell stack 110 and the pressure in the secondary-side pressure chamber 213 becomes lower so that the combined force of the force of hydrogen in the secondary-side pressure chamber 213 to urge the diaphragm 231 upward in FIG. 6 and the force of hydrogen in the primary-side pressure chamber 212 to urge the valve body 220 upward in FIG. 6 is less than the force of the compression coil spring 235 to urge the diaphragm 231 downward in FIG. 6, the valve head 221 moves off the valve seat 215, setting the first pressure reducing valve 201 in the open state (see FIG. 8). Then, hydrogen flows into the secondary-side pressure chamber 213 from the primary-side pressure chamber 212, making the pressure in the secondary-side pressure chamber 213 higher so that the first pressure reducing valve 201 comes to the closed state.

The pressure to permit seating/separation of the valve body 220, i.e., the pressure on the secondary side of the first pressure reducing valve 201 is set adequately by changing the spring force of the compression coil spring 235. The spring force of the compression coil spring 235 is changed by changing the thickness of a wire forming the compression coil spring 235, the material for the wire, etc.

Therefore, the pressure reducing mechanism of the first pressure reducing valve 201 includes the valve body 220, the diaphragm 231 and the compression coil spring 235.

After the maintenance or the like, the amount of hydrogen in the secondary-side pressure chamber 213 is small, so that the pressure in the secondary-side pressure chamber 213 becomes less than the shutoff pressure. Consequently, when the combined force of the force of hydrogen in the secondary-side pressure chamber 213 to urge the diaphragm 231 upward in FIG. 8 and the force of hydrogen in the primary-side pressure chamber 212 to urge the valve body 220 upward in FIG. 8 becomes less than the force of the compression coil spring 235 to urge the diaphragm 231 downward in FIG. 8 regardless of the OFF state of the solenoid 243, so that the valve head 221 moves off the valve seat 215, setting the first pressure reducing valve 201 in the open state. When the pressure in the secondary-side pressure chamber 213 becomes higher than the shutoff pressure, the first pressure reducing valve 201 comes to the closed state as shown in FIG. 6.

Returning to FIG. 1, the description continues. The second pressure reducing valve 124 reduces the pressure of hydrogen to be supplied to the primary side (upstream side). That is, the second pressure reducing valve 124 is a regulator to regulate the secondary pressure. The second pressure reducing valve 124 is configured to include a valve body, a valve seat, and a diaphragm (none shown) and regulate the secondary pressure by repeating seating/separation of the valve body on/from the valve seat based on the pilot pressure input through a pipe 124b and the secondary pressure as described in, for example, Japanese Unexamined Patent Application Publication No. 2009-277620, the entire contents of which are incorporated herein by reference. The pipe 124b is connected to a pipe 141a through which air directed toward the cathode passage 112 flows, so that the pressure in the pipe 141a is input to the second pressure reducing valve 124 as the pilot pressure.

The ejector 125 is a vacuum pump that ejects new hydrogen from the hydrogen tank 10 by means of a nozzle to generate a negative pressure, which is used for suction and mixing of an anode-off gas containing hydrogen in a pipe 125b, and ejects the mixed gas toward the anode passage 111.

The relief valve 126 is connected to the pipe 123a via a pipe 126a. When the pressure in the pipe 123a becomes equal to or higher than a predetermined relief pressure, the relief valve 126 opens to discharge hydrogen in the pipe 123a outside the vehicle.

According to the embodiment, the pipe 122a that connects the first shutoff valve 20 to the first pressure reducing valve 201 forms a high-pressure line (first line) through which high-pressure hydrogen from the hydrogen tank 10 flows. The pipes 123a and 123b that connect the first shutoff valve 20 to the second pressure reducing valve 124 form an intermediate-pressure line (second line) through which intermediate-pressure hydrogen whose pressure is reduced at the first pressure reducing valve 201 flows.

The outlet of the anode passage 111 is connected to the intake port of the ejector 125 via the pipe 125b. The anode-off gas containing unconsumed hydrogen and discharged from the anode passage 111 is returned to the ejector 125, and is supplied again to the anode passage 111. As a result, hydrogen recirculates. The pipe 125b is provided with a gas-liquid separator (not shown) that separates liquid moisture entrained in the anode-off gas.

A midway of the pipe 125b is connected to a diluter 142 to be discussed later via a pipe 127a, the purge valve 127, and a pipe 127b. The purge valve 127 is regularly opened by the ECU 170 when an impurity (vapor, nitrogen, etc.) contained in the anode-off gas circulating in the pipe 125b is discharged (purged) at the time the fuel cell stack 110 generates power.

The high-pressure sensor 131 is mounted on the pipe 122a, and is one example of the second pressure detector that detects pressure $P_1$ in the pipe 122a (high-pressure line) and outputs the detection value to the ECU 170. The high-pressure sensor 131 is also one example of the first pressure detector that detects pressure $P_0$ or the internal tank pressure of the hydrogen tank 10, and outputs the detection value to the ECU 170. That is, the high-pressure sensor 131 detects the pressure $P_1$ with the first shutoff valve 20 open at the time of previous halting of the system, so that the detection value is equivalent to the pressure $P_0$. The pressure $P_0$ detected by the high-pressure sensor 131 is output to the ECU 170 to be stored therein.

The intermediate-pressure sensor 132 is mounted on the pipe 123a, and is one example of the third pressure detector that detects pressure $P_2$ in the pipe 123a (intermediate-pressure line) and outputs the detection value to the ECU 170.

Cathode System

The cathode system includes the compressor 141 and the diluter 142.

The ejection port of the compressor 141 is connected to the inlet of the cathode passage 112 via the pipe 141a. When activated in response to an instruction from the ECU 170, the compressor 141 sucks air containing oxygen, and supplies the air to the cathode passage 112 via pipe 141a. The compressor 141, the aforementioned first shutoff valve 20, etc. are powered by the fuel cell stack 110 and/or a battery 153 to be discussed later.

The outlet of the cathode passage 112 is connected to supplied to the diluter 142 via a pipe 142a, so that the cathode-off gas discharged from the cathode passage 112 passes through the pipe 142a to be supplied to the diluter 142.

The diluter 142 is a container which mixes the anode-off gas with the cathode-off gas and dilutes hydrogen in the anode-off gas with the cathode-off gas (dilution gas), and has dilution space inside. The gas after dilution is discharged outside the vehicle via a pipe 142b.

Power Control System

The power control system includes the motor 151, a power controller 152, and the battery 153. The motor 151 is connected to the output terminal (not shown) of the fuel cell stack 110 via the power controller 152, and the battery 153 is connected to the power controller 152. That is, the motor 151 and the battery 153 are connected in parallel to the power controller 152.

The motor 151 is an electric motor that generates drive force for driving the fuel cell vehicle.

The power controller 152 has (1) a capability of controlling the output of the fuel cell stack 110 (generated power, current value, voltage value) and (2) a capability of controlling charging/discharging of the battery 153, both in response to instructions from the ECU 170. The power controller 152 is configured to include various electronic circuits, such as a DC-DC chopper circuit.

The battery 153 is an electric storage device that charges and discharges power, and is constituted by a battery pack having, for example, a plurality of lithium ion unit cells.

Other Devices

An IG 161 is an ignition switch for the fuel cell system 100 (fuel cell vehicle), and is provided around the driver's seat. The IG 161 is connected to the ECU 170, so that the ECU 170 detects an ON/OFF signal from the IG 161.

ECU

The ECU 170 (control unit) is a control device that performs electrical control on the fuel cell system 100, and is configured to include a CPU, a ROM, a RAM, various interfaces, and an electronic circuit. In accordance with a program stored inside, the ECU 170 controls various devices and executes various processes.

Operation of Fuel Cell System

Next, the operations and effects of the first shutoff valve 20 and the first pressure reducing valve 201 upon activation of the fuel cell system 100, i.e., upon initiation of hydrogen supply to the fuel cell stack 110 will be described referring to FIGS. 9, 10A, 10B, and 11.

When the driver switches the IG 161 0N and the ECU 170 detects the ON signal from the IG 161, the fuel cell system 100 is activated to start a sequence of processes illustrated in FIG. 9 to supply hydrogen to the fuel cell stack 110. Upon initiation of the sequence of processes, the first shutoff valve 20, the first pressure reducing valve 201, the second shutoff valve 123 and the second pressure reducing valve 124 are in the closed state.

First, the ECU 170 acquires the pressure $P_2$ detected by the intermediate-pressure sensor 132 upon activation (step S1), and energizes the electromagnetic coil 24c of the first shutoff valve 20 to open the pilot valve body 23 (step S2).

The ECU 170 compares the start-up pressure $P_2$ with a predetermined value (=shutoff pressure) (step S3). When the start-up pressure $P_2$ is less than the predetermined value (Yes in step S3), the ECU 170 calculates a pressure equalization time from the point of completion of the opening of the pilot valve body 23 to the point of time when the on-off valve body 22 starts opening, based on the pressures detected by the high-pressure sensor 131 and the intermediate-pressure sensor 132, and adds a predetermined time to the pressure equalization time to set a valve-open waiting time (step S4).

When the start-up pressure $P_2$ is less than the predetermined value, the first pressure reducing valve 201 is in the open state shown in FIG. 8. Transition of the state of the first shutoff valve 20 from the open state of the pilot valve body 23 shown in FIG. 5B to the open state of the on-off valve body 22 shown in FIG. 5C requires that the pressure in the secondary-side pressure chamber 213 of the first pressure reducing valve 201 becomes equal to or higher than the shutoff pressure to set the first pressure reducing valve 201 in the closed state shown in FIG. 6, and then the pressure in the pipe 122a rises so that the pressure in the pipe 122a gets equal to the pressure in the hydrogen tank 10.

An example of a scheme of setting the valve-open waiting time by means of the ECU 170 will be described below.

The flow rate (pilot flow rate) Q of a hydrogen gas flowing through the pilot passage 22b when the pilot valve body 23 alone is opened is calculated by the following equation.

$$Q = A \{f_1(P_0, P_2)\} S_1^2$$

where A: constant which is determined by the pressure loss of the pilot valve body 23 (pilot passage 22b) and the type of the gas (hydrogen gas in this example),
$S_1$: cross-sectional area of the pilot valve body 23 or the cross-sectional area of the pilot passage 22b in this example,
$P_0$: tank pressure or pressure detected by the high-pressure sensor 131 at the time of previous halting, and
$P_2$: pressure in the intermediate-pressure line or pressure currently detected by the intermediate-pressure sensor 132.

The values of A and $S_1$ along with the values of $V_1$, $V_2$ and $P_4$ (to be discussed later) are stored in the ECU 170 beforehand. The ECU 170 also stores the pressure detected by the high-pressure sensor 131 at the time of previous halting, i.e., the tank pressure $P_0$.

In the equation, $f_1$ represents the flow rate of the hydrogen gas per unit cross section in the pilot passage 22b, and is a function having $P_0$ and $P_2$ as parameters. As $P_2$ gets higher to make the differential pressure $P_0-P_2$ smaller, $f_1$ gets smaller.

Figure 10B:
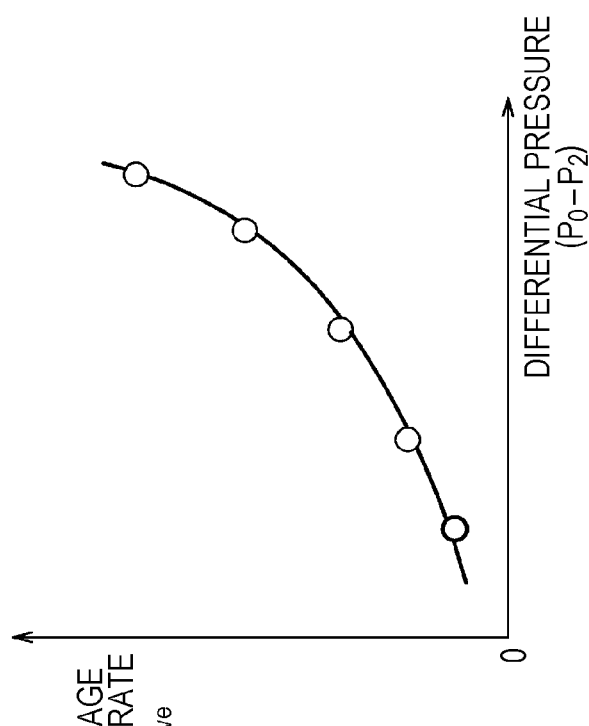
FIG. 10B is a graph showing an example of the relation between a differential pressure and an average flow rate.
Figure 10A:
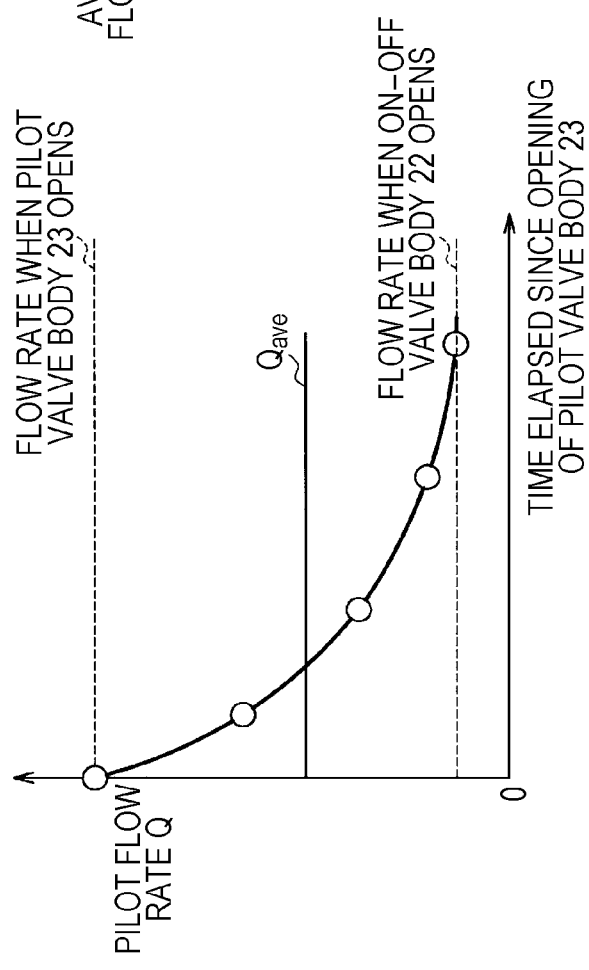
FIG. 10A is a graph showing the relation between a time elapsed since opening of a pilot valve, and a pilot flow rate.

The ECU 170 calculates the pilot flow rate Q at a give time interval until the on-off valve body 22 opens after the opening of the pilot valve body 23, and acquires an approximate curve shown in FIG. 10A based on a plurality of pilot flow rates Q calculated. Then, the ECU 170 performs time integral of the acquired approximate curve to calculate an average flow rate $Q_{ave}$.

The ECU 170 calculates the average flow rate $Q_{ave}$ for each differential pressure $(P_0-P_2)$, and acquires an approximate curve shown in FIG. 10B based on a plurality of average flow rates $Q_{ave}$ calculated.

That is, the average flow rate $Q_{ave}$ is expressed as a function $f_2$ having the differential pressure $P_0-P_2$ as a parameter.

$$Q_{ave} = f_2(P_0-P_2)$$

The flow rate, H, of the hydrogen gas which is needed from the point of opening of the pilot valve body 23 to the point of opening of the on-off valve body 22 is calculated by the following equation.

$$H = f_3(P_4, V_2) - f_3(P_2, V_2) + f_3(P_0, V_1) - f_3(P_1, V_1)$$

where $V_1$ represents the volume of the high-pressure line, $V_2$ represents the volume of the intermediate-pressure line, $P_1$ represents the pressure in the high-pressure line or the pressure currently detected by the high-pressure sensor 131, $P_4$ represents the shutoff pressure of the first pressure reducing valve 201, $f_2(P_1, V_1)$ represents the amount of the hydrogen gas remaining in the high-pressure line at first, $f_3(P_0, V_1)$ represents the amount of the hydrogen gas present in the high-pressure line at the time the on-off valve body 22 opens, $f_3(P_2, V_2)$ represents the amount of the hydrogen gas remaining in the intermediate-pressure line at first, and $f_3(P_4, V_2)$ represents the amount of the hydrogen gas present in the intermediate-pressure line at the time the on-off valve body 22 opens.

The ECU 170 calculates a pressure equalization time $T_1$ or a time from the point of time at which opening of the pilot valve body 23 has completed to the point of time at which the on-off valve body 22 starts opening using the following equation.

$$T_1 = H/Q_{ave}$$

Further, the ECU 170 sets a valve-open waiting time T or a time from the point of time at which the ECU 170 has performed opening control on the first shutoff valve 20 (initiation of energization of the electromagnetic coil 24c) to the point of time at which the ECU 170 performs opening control on the first pressure reducing valve 201 (initiation of energization of the electromagnetic coil of the solenoid 243) using the following equation.

$$T = T_1 + (\alpha + \beta) \times \gamma$$

where $\alpha$: time from the initiation of energization of the electromagnetic coil 24c to the completion of opening of the pilot valve body 23,
$\beta$: time from the point of time when the on-off valve body 22 starts opening and the point of time when the opening of the on-off valve body 22 completes, and
$\gamma$: safety margin ($\gamma > 1$)

The values of $\alpha$, $\beta$ and $\gamma$ are stored in the ECU 170 beforehand.

When the comparison of the start-up pressure $P_2$ with the predetermined value in step S3 shows that the start-up pressure $P_2$ is equal to or higher than the predetermined value (No in step S3), the ECU 170 sets the valve-open waiting time to a predetermined time (step S5).

One example of the valve-open waiting time set will be described below referring to FIG. 11.

Line $X_{11}$ represents the valve-open waiting time when the start-up pressure $P_2$ is lower than the predetermined pressure (shutoff pressure) by 100 to 300 kPa, line $X_{12}$ represents the valve-open waiting time when the start-up pressure $P_2$ is lower than the predetermined pressure (shutoff pressure) by 300 to 500 kPa, line $X_{13}$ represents the valve-open waiting time when the start-up pressure $P_2$ is lower than the predetermined pressure (shutoff pressure) by 500 kPa or more, and line $X_{21}$ represents the valve-open waiting time when the start-up pressure $P_2$ is equal to or higher than the predetermined pressure. As apparent from FIG. 11, when the start-up pressure $P_2$ is lower than the predetermined pressure (shutoff pressure), the lower the pressure $P_2$ is, the longer the valve-open waiting time is set, and the higher the tank pressure $P_0$ is, the shorter the valve-open waiting time is set. As apparent from the lines $X_{11}$, $X_{12}$, and $X_{13}$, the valve-open waiting time when the start-up pressure $P_2$ is lower than the predetermined pressure (shutoff pressure) is set to vary stepwise. The valve-open waiting time varying stepwise (e.g., region C of the line $X_{11}$) is set to the maximum value of the valve-open waiting time calculated in that region. When the start-up pressure $P_2$ is equal to or higher than the predetermined pressure (shutoff pressure), the valve-open waiting time is set shorter than the valve-open waiting time set when the start-up pressure $P_2$ is lower than the predetermined pressure (shutoff pressure), and is set constant regardless of the tank pressure $P_0$.

When the time elapsed since the initiation of energization of the electromagnetic coil 24c becomes equal to or longer than the valve-open waiting time (Yes in step S6), the ECU 170 energizes the electromagnetic coil of the solenoid 243 of the first pressure reducing valve 201 to open the first pressure reducing valve 201 (step S7). Thereafter, the ECU 170 opens the second shutoff valve 123.

When the pressure $P_2$ detected by the intermediate-pressure sensor 132 is lower than the shutoff pressure at the time gas supply to the fuel cell stack 110 from the hydrogen tank 10 starts, the fuel cell system 100 according to the embodiment of the disclosure calculates the pressure equalization time from the point of time at which opening of the pilot valve body 23 has completed to the point of time at which the on-off valve body 22 starts opening, based on the pressures $P_0$, $P_1$ and $P_2$, sets the valve-open waiting time based on the pressure equalization time, and performs opening control on the first pressure reducing valve 201 upon elapse of the valve-open waiting time after the opening control on the first shutoff valve 20. Therefore, the fuel cell system 100 can adequately set the valve-open waiting time without using a device which detects a change in current.

Although only one embodiment of the disclosure has been described herein, the disclosure is not limited to the embodiment and may be modified as needed without departing from the spirit or scope of the disclosure. For example, the pressure sensor (first pressure detecting unit) that detects the pressure $P_0$ of the hydrogen gas in the hydrogen tank 10 may be provided as a separate unit from the high-pressure sensor 131. The fluid supply system according to the disclosure may be adapted to a fuel cell system (e.g., stationary fuel cell system) other than the fuel cell system for a fuel cell vehicle, and may be able to supply a fluid to other components than the fuel cell. Further, the first shutoff valve 20 may be provided as a separate unit from the hydrogen tank 10, and the first pressure reducing valve 201 may be configured not to include a shutoff mechanism. The fluid supply system may be configured in such a way that when the pressure $P_2$ is lower than the shutoff pressure (predetermined pressure), the pressure equalization time is calculated using the above-described scheme, and the valve-open waiting time is set based on the pressure equalization time. In this case, when the pressure $P_2$ is equal to or higher than the predetermined pressure, the valve-open waiting time can be set to the predetermined time as mentioned above.

An fluid supply system according to one aspect of an exemplary embodiment includes a fluid supply source that supplies a fluid, a first valve unit provided downstream of the fluid supply source and capable of switching between a first open state to permit flow of the fluid from the fluid supply source and a first closed state to block flow of the fluid, a first line which is provided downstream of the first valve unit and in which the fluid flows, a second valve unit provided downstream of the first line and capable of switching between a second open state to permit flow of the fluid from the first line and a second closed state to block flow of the fluid from the first line, a second line which is provided downstream of the second valve unit and in which the fluid flows, a first pressure detecting unit that detects a pressure in the fluid supply source, a second pressure detecting unit that detects a pressure in the first line, a third pressure detecting unit that detects a pressure in the second line, and a control unit that controls the first valve unit and the second valve unit. The first valve unit has a pilot valve and a main valve. The second valve unit opens when the pressure in the second line is less than a shutoff pressure even when the second valve unit is set in the second closed state by the control unit. When the pressure detected by the third pressure detecting unit is less than the shutoff pressure at a time of starting supply of the fluid from the fluid supply source, the control unit calculates a pressure equalization time from a point of time when the pilot valve has opened to a point of time when the main valve starts opening, based on the pressures detected by the first pressure detecting unit, the second pressure detecting unit and the third pressure detecting unit, sets a valve-open waiting time based on the pressure equalization time, and controls opening of the second valve unit upon elapse of the valve-open waiting time after controlling opening of the first valve unit.

This configuration of the embodiment can allow the valve-open waiting time to be adequately set without using a device that detects a change in current.

In the fluid supply system according to the aspect of the embodiment, it is preferable that when the pressure detected by the third pressure detecting unit is less than the shutoff pressure at the time of starting supply of the fluid, the control unit should set the valve-open waiting time longer when the pressure detected by the third pressure detecting unit is lower, or that when the pressure detected by the third pressure detecting unit is less than the shutoff pressure at the time of starting supply of the fluid, the control unit should set the valve-open waiting time shorter when the pressure detected by the first pressure detecting unit is lower.

Obviously, numerous modifications and variations of the present invention are possible in light of the above teachings. It is therefore to be understood that within the scope of the appended claims, the invention may be practiced otherwise than as specifically described herein.

What is claimed is:

1. A fluid supply system comprising:
   a fluid supply source to supply a fluid;
   a first valve unit provided downstream of the fluid supply source to switch between a first open state to permit flow of the fluid from the fluid supply source and a first closed state to block flow of the fluid, the first valve unit having a pilot valve and a main valve;
   a first line which is provided downstream of the first valve unit and in which the fluid flows;
   a second valve unit provided downstream of the first line to switch between a second open state to permit flow of the fluid from the first line and a second closed state to block flow of the fluid from the first line;
   a second line which is provided downstream of the second valve unit and in which the fluid flows;
   a first pressure detector configured to detect a pressure in the fluid supply source;
   a second pressure detector configured to detect a pressure in the first line;
   a third pressure detector configured to detect a pressure in the second line;
   a controller configured to control the first valve unit and the second valve unit, the second valve unit opening if the pressure in the second line is less than a shutoff pressure even if the second valve unit is set in the second closed state by the controller; and
   if the pressure detected by the third pressure detector is less than the shutoff pressure at a timing of starting supply of the fluid from the fluid supply source, the controller
   calculating a pressure equalization time from a timing at which opening of the pilot valve is completed to a timing at which the main valve starts opening, based on the pressures detected by the first pressure detector, the second pressure detector and the third pressure detector,
   setting a valve-open waiting time based on the pressure equalization time, and controlling opening of the second valve unit upon elapse of the valve-open waiting time after controlling opening of the first valve unit.

2. The fluid supply system according to claim 1, wherein if the pressure detected by the third pressure detector is less than the shutoff pressure at the timing of starting supply of the fluid, the lower the pressure detected by the third pressure detector is, the longer the valve-open waiting time is set by the controller.

3. The fluid supply system according to claim 1, wherein if the pressure detected by the third pressure detector is less than the shutoff pressure at the time of starting supply of the fluid, the lower the pressure detected by the first pressure detector is, the shorter the valve-open waiting time is set by the controller.

4. The fluid supply system according to claim 1, wherein the first pressure detector and the second pressure detector share a common pressure detector configured to detect the pressure in the fluid supply source and the pressure in the first line.

5. The fluid supply system according to claim 4,
wherein the common pressure detector is configured to detect the pressure in the fluid supply source at a time of previous halting of the fluid supply system as a tank pressure, and
wherein the controller is configured to store the tank pressure detected by the common pressure detector.

* * * * *